United States Patent
Hart et al.

(10) Patent No.: US 8,753,891 B2
(45) Date of Patent: Jun. 17, 2014

(54) SEPARATION OF COLLOIDAL SUSPENSIONS USING LASER OPTICAL PRESSURE FLUIDIC DEVICES

(71) Applicants: Sean J. Hart, Keswick, VA (US); Alexander V. Terray, Alexandria, VA (US)

(72) Inventors: Sean J. Hart, Keswick, VA (US); Alexander V. Terray, Alexandria, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 13/961,968

(22) Filed: Aug. 8, 2013

(65) Prior Publication Data

US 2013/0319954 A1  Dec. 5, 2013

Related U.S. Application Data

(60) Division of application No. 11/962,541, filed on Dec. 21, 2007, now Pat. No. 8,529,760, which is a continuation of application No. 11/840,646, filed on Aug. 17, 2007, now abandoned.

(51) Int. Cl.

| | | |
|---|---|---|
| *B01D 17/00* | (2006.01) | |
| *G01N 21/00* | (2006.01) | |
| *G01N 23/00* | (2006.01) | |
| *B07C 5/10* | (2006.01) | |
| *B01J 19/12* | (2006.01) | |
| *B01D 21/00* | (2006.01) | |

(52) U.S. Cl.
CPC ........... *B01J 19/121* (2013.01); *B01D 21/0009* (2013.01)
USPC ............ 436/63; 209/1; 210/745; 210/748.06; 210/748.09; 356/335; 356/336; 435/29; 435/30; 372/54; 436/164

(58) Field of Classification Search
CPC .. B01D 17/00; B01D 21/009; B01D 21/0009; C02F 1/30; G01N 21/00; G01N 21/01; G01N 23/00; G01N 2015/025; G01N 2015/0288; G01N 2015/03; G01N 2015/1434; G01N 2015/144; G01N 2015/149; B07C 5/10; B01J 19/12; B01J 19/121
USPC ............ 210/192, 541, 748.01, 748.06, 257.1, 210/258, 542, 745, 748.09; 209/1, 155; 250/222.2, 251, 396 R, 397; 356/36–38, 73.1, 335–343, 432, 441, 356/442; 422/82.05, 82.11; 204/450, 451, 204/600, 601; 372/54, 69; 435/4, 5, 29, 30, 435/242, 243; 436/63, 164, 180
See application file for complete search history.

(56) References Cited

U.S. PATENT DOCUMENTS 3,808,550 A * 4/1974 Ashkin .......................... 372/97
3,960,449 A * 6/1976 Carleton et al. ............... 356/340

(Continued)

*Primary Examiner* — Joseph Drodge
(74) *Attorney, Agent, or Firm* — US Naval Research Laboratory; Suresh Koshy (57) ABSTRACT

A method of particle separation, wherein a collimated light source operable to generate a collimated light source beam is provided. The collimated light source beam includes a beam cross-section. A body is provided, wherein the body defines a wall and a first channel in a first plane. The first channel includes a first channel cross-section, the first channel being oriented to receive the collimated light source beam such that the beam cross-section completely overlaps the channel cross-section. The collimated light source beam is transmitted through the channel. A fluid sample is transmitted through the channel, fluid sample including a plurality of particles of a same type. All of the particles of the plurality of particles are separated axially along the collimated light source beam. All of the particles of the plurality of particles are retained against the wall in the collimated light source beam.

6 Claims, 7 Drawing Sheets

(56) References Cited

U.S. PATENT DOCUMENTS

| | | | |
|---|---|---|---|
| 4,887,721 A * | 12/1989 | Martin et al. | 209/579 |
| 5,495,105 A * | 2/1996 | Nishimura et al. | 250/251 |
| 5,674,743 A * | 10/1997 | Ulmer | 435/287.2 |
| 5,752,606 A * | 5/1998 | Wilson et al. | 209/2 |
| 5,906,732 A * | 5/1999 | Kohno | 210/94 |
| 6,084,670 A * | 7/2000 | Yamazaki et al. | 356/343 |
| 6,416,190 B1 * | 7/2002 | Grier et al. | 359/614 |
| 6,585,939 B1 * | 7/2003 | Dapprich | 422/503 |
| 6,778,724 B2 * | 8/2004 | Wang et al. | 385/16 |
| 6,815,664 B2 * | 11/2004 | Wang et al. | 250/251 |
| 6,841,356 B1 * | 1/2005 | Fuhr et al. | 435/29 |
| 7,106,442 B2 * | 9/2006 | Silcott et al. | 356/338 |
| 7,276,170 B2 * | 10/2007 | Oakey et al. | 210/767 |
| 7,471,393 B2 * | 12/2008 | Trainer | 356/336 |
| 8,529,760 B1 * | 9/2013 | Hart et al. | 210/257.1 |
| 2002/0058332 A1 * | 5/2002 | Quake et al. | 435/288.3 |
| 2003/0054655 A1 * | 3/2003 | Nakano et al. | 438/710 |
| 2009/0188795 A1 * | 7/2009 | Oakey et al. | 204/451 |
| 2010/0108577 A1 * | 5/2010 | Wang et al. | 209/606 |

\* cited by examiner

SEPARATION OF COLLOIDAL SUSPENSIONS USING LASER OPTICAL PRESSURE FLUIDIC DEVICES

PRIORITY CLAIMS AND REFERENCE TO RELATED APPLICATIONS

This application is a divisional patent application of U.S. patent application Ser. No. 11/962,541, now U.S. Pat. No. 8,529,760 which was a Continuation of U.S. patent application Ser. No. 11/840,646, filed 17 Aug. 2007, entitled LASER OPTICAL SEPARATOR AND METHOD FOR SEPARATING COLLOIDAL SUSPENSIONS," and incorporated herein by reference, wherein U.S. patent application Ser. No. 11/840,646 now abandoned, is a Continuation-In-Part patent application of U.S. patent application Ser. No. 10/673,351, now abandoned, filed 30 Sep. 2003, entitled "LASER OPTICAL SEPARATOR AND METHOD FOR SEPARATING COLLOIDAL SUSPENSIONS," and incorporated herein by reference.

BACKGROUND OF THE INVENTION

1. Field of the Invention

This invention relates in general to a particle separator for fluids, and in particular to a particle separator for fluids using optical pressure.

2. Description of the Related Art

The invention of the laser has made possible many new areas of research and technology. Unique optical properties allowing a laser to be highly focused have made detailed studies of radiation pressure possible. Most important is the laser's ability to focus down to a tiny spot size, resulting in a large photon density. This large number of photons translates into a significant amount of radiation force applied to a particle in the beam path. Radiation pressure has been used to trap and direct particles caught in the focus of a laser beam. Manipulation of the beam focus and beam position can be used to move particles into desired positions and configurations. The types of objects that have been optically trapped include glass and polymer spheres, viruses, bacteria, and biological cells. Recently, size-based separation of particles flowing in a fluid opposite to the direction of laser propagation has been achieved.

In recent years, a technique has been developed, termed optical chromatography, which involves laser separation of differently sized particles in the 1-10 micron range. When particles in a liquid flowing within a capillary encounter a laser beam propagating in the opposite direction, the particles are subjected to optical pressure near the beam focal point (i.e., the region of highest photon density) intense enough to impart momentum sufficient to overcome fluid drag forces. The result is that particles in the fluid become trapped and move against the fluid flow until the beam diverges and the photon density decreases. The particles remain stationary when the optical pressure equals the force exerted on the particles by the liquid flow (i.e., Stoke's force).

For a sphere of refractive index $n_2$ in a medium of lower refractive index, $n_1$, the force due to optical pressure of the laser, $F_{optical\_pressure}$, is given by equation 1:

$$F_{optical\_pressure} = \frac{2n_1 P}{c}\left(\frac{a}{\omega}\right)^2 Q^*, \quad (1)$$

where P is the power of the laser, c is the speed of light, a is the sphere radius, $\omega$ is the beam radius, and $Q^*$ is the conversion efficiency of optical radiation pressure to Newtonian force on the particle. The term $(n_1 P/c)$ defines the incident momentum per second in a medium of refractive index $n_1$. The dimensionless parameter, $Q^*$ defines the conversion efficiency of optical pressure transfer arising from light reflection and refraction based upon geometrical considerations and is calculated using the Fresnel reflection and transmission coefficients, which in turn depend upon $n_2$, the refractive index of the particle.

Separation in a liquid flow is measured by the distance particles travel away from the focal point against the fluid flow. This distance traveled is the optical retention distance, z: the point at which the optical pressure equals the force exerted on the spheres by the liquid molecules and is defined, according to Equation 2:

$$z = \frac{\pi \omega_0^2}{\lambda} \sqrt{\frac{n_1 PQa}{3\pi \eta v c \omega_0} - 1}, \quad (2)$$

where P is the power of the $TEM_{00}$ mode laser, c is the speed of light, a is the sphere radius, $\omega_{0\square}$ is the beam radius at the focal point, $\lambda$ is the wavelength of light, v is the velocity of the particle in the water flow, and $n_1$ is the viscosity of water. The refractive index of the particle is used in the calculation of the efficiency of optical pressure transfer, Q.

Optical pressure has been used extensively in research and industry for biological size-based micromanipulation. The chemical effect on optical pressure in bacteria has been observed: small chemical differences in the surface coatings have been shown to result in large force differentials on different strains of the same species of non-pathogenic bacteria. However, the theoretical chemical dependence, development, and use of optical pressure chemical differentials for separation have not yet been demonstrated.

SUMMARY OF THE INVENTION

An embodiment of the invention includes a device having a collimated light source operable to generate a collimated light source beam, the collimated light source beam comprising a beam cross-section. The device further includes at least one body defining a first channel in a first plane, the first channel comprising a first channel cross-section, the first channel being oriented to receive the collimated light source beam such that the beam cross-section completely overlaps the first channel cross-section. Optionally, the body defines a second channel in a second plane orthogonal to the first plane, wherein the body defines a third channel in a third plane orthogonal to the first plane.

Optionally, the device includes a fluid input reservoir communicating with the second channel. Optionally, the device includes a pump communicating with the fluid input reservoir. For example, the pump includes, for example, a pump having a fixed flow rate or a pump having a dynamically changeable flow rate. For example, the pump includes a gravity-feed pump, a pneumatic pump, a syringe pump, a piezoelectric pump, a peristaltic pump, an electro-osmotic flow pump, or a photophoresis pump.

Optionally, the first channel includes a first end and a second end, the first channel defining a bulge at the first end, at the second end, or between the first end and the second end. Optionally, the shape of the bulge is, for example, a circular shape, an oval shape, a rectangular shape, a triangular shape, a venturi shape, a diamond-bulge shape, a tapered shape, a pentagonal shape, a hexagonal shape, and/or a helical shape. These two-dimensional shapes are optionally used in one of two ways: a 2-D shape that is lofted (i.e., raised to create 3-D shape) or a 2-D shape that is lathed (i.e., rotated 360 degrees to create a 3-D shape).

Optionally, the body includes a substrate, a first plate, and a second plate. The substrate defines the first channel, the first plate defining the second channel, and the second plate defining the third channel.

Optionally, the device also includes, for example, a lens, a beam chopper, an acousto-optic modulator, a phase-shifting optic, a holographic element, and/or a mirror located between the collimated light source and the first channel, and communicating with the collimated light source such that the beam cross-section overlaps the channel cross-section.

Optionally, the first channel includes a liquid core waveguide.

Optionally, the collimated light source includes, for example, a tunable laser, a continuous wave laser, a fiber laser, a pulsed laser, a femtosecond laser, a near infrared laser, a visible light laser, an ultraviolet light laser, a diode laser, or a vertical cavity surface emitting laser.

Optionally, the collimated light source includes, for example, a collimated light source having dynamically changeable power and/or a dynamically moveable collimated light source.

Optionally, the at least one body includes a plurality of bodies, each body comprising a respective channel, each respective channel comprising a respective channel cross-section, each respective channel being oriented to receive the collimated light source beam such that the beam cross-section completely overlaps the respective channel cross-section.

Optionally, the collimated light source beam includes, for example, a polarized beam, a Bessel beam, or one of several Hermite-Gauss beam types: $HG_{00}$, $HG_{01}$, $HG_{10}$, and $HG_{11}$, and higher order modes, or one of several Laguerre-Gauss beam types: $LG_0^0$, $LG_0^{+1}$, $LG_0^{-1}$, or higher order modes which possess angular momentum. Acceptable Hermite-Gauss Beams have the form $HG_{nm}$ where n and m are coefficients describing the beam order. For example, n and m are greater than 1. Acceptable Laguerre-Gauss beams have the form $LG_n^m$, where n and m are coefficients describing the beam order. For example, n and m are greater than 1.

Another embodiment of the invention includes a method. A collimated light source operable to generate a collimated light source beam is provided. The collimated light source beam includes a beam cross-section. A body is provided, wherein the body defines a wall and a first channel in a first plane. The first channel includes a first channel cross-section, the first channel being oriented to receive the collimated light source beam such that the beam cross-section completely overlaps the channel cross-section. The collimated light source beam is transmitted through the channel. A fluid sample is transmitted through the channel, fluid sample including a plurality of particles of a same type. All of the particles of the plurality of particles are separated axially along the collimated light source beam. All of the particles of the plurality of particles are retained against the wall in the collimated light source beam.

Optionally, the fluid sample includes a colloidal sample and/or a biological sample. Optionally, the biological sample includes the fluid sample including one of a plurality of viruses and a plurality of macrophages; the fluid sample including a plurality of spores; the fluid sample including a plurality of vegetative bacterial cells; the fluid sample including a plurality of yeast cells; the fluid sample including a plurality of eukaryotic cells; the fluid sample including a plurality of cancer cells; the fluid sample including a plurality of sperm cells; and/or the fluid including a plurality of pluripotent stem cells.

Optionally, a fluid sample product comprising a greater concentration of particles than the fluid sample is produced.

Optionally, a fluid sample product free of the plurality of particles in the fluid sample is produced.

Separating chemically different particles offers important new possibilities for analysis and possible purified collection of colloidal samples such as organic particulates, inorganic particles (glass and metal particles), and biological species such as cells, bacteria, and viruses. Differentiation of biological samples such as bacteria is based upon chemical differences in their capsules. Polysaccharides, lectins, lipoteichoic acids, and proteins are examples of the biomolecules present in various bacterial species and strains. There is a substantial range of refractive indices in bacterial and viral samples due to their different chemical compositions. The ability to separate biological species based upon physical and chemical properties using only light interaction with samples in a simple fluid flow has great potential benefits when applied, for example, to bio-warfare detection and biomedical analysis. In an embodiment of the invention, not only are samples physically separable using light, but from their position in the separation field one can determine their refractive index. That is, from a predicted location, an embodiment of the invention permits identification of specific entities in an unknown mixture.

In an embodiment of the invention, when samples are optically retained against a glass wall of a bulge, such as when occurs using the microfluidic step function type device, the extent to which they are deformed against the glass wall by the force of the laser is related to their composition and mechanical structure. This has beneficial implications for biological cells that are affected by disease such as cancer, which is known to directly affect the cytoskeleton of cells. For example, cancerous cells are known to have a more rigid cell structure than their non-cancerous counterparts. Through observation of their deformation either in the channel or against the wall, an estimate of disease state is optionally obtained, in an embodiment of the invention. As another example, erythrocytes undergo stretching and compression which depends on their age; older erythrocytes being less flexible. This stretching/compression is visible in the channel or against the wall. With this understanding, an embodiment of the invention has application in analysis of disease states in biological systems (e.g., cells and small tissue samples).

DETAILED DESCRIPTION OF THE INVENTION

The invention employs a phenomenon called optical pressure to separate particles of varying refractive indices, sizes, shapes, and morphology. Optical pressure occurs when photons interact with microscopic particles imparting a fraction of their momentum when they scatter at the surface or refract through the particle. This effect is significant when using lasers due to the extremely large number of photons available. Particles experience a radiation pressure force in the direction of the laser propagation and towards regions of high intensity, i.e. the focal point. The magnitude of the optical pressure depends on chemical composition (refractive index) of the particle, and its size, for example, as discussed in A. Ashkin, *Biophys. J.*, 61, 569-582, 1992; T. Kaneta, Y. Ishidzu, N. Mishima, and T. Imasaka, *Anal. Chem.*, 69, 2701-2710, 1997, incorporated herein by reference; and A. Ashkin. J. M. Dziedzic, J. E. Bjorkholm, S. Chu, *Optics Letters*, 11, 5, 288, 1986, incorporated herein by reference.

The magnitude of optical pressure is due to several properties including size, shape, and refractive index, conventional laser trapping and separation research has focused primarily on the size dependence and the development of laser micro-manipulation techniques, such as described in K. Taguchi, H, Ueno, Y. Hiramatsu, and M. Ikeda, Electronics Letters, 33, 5, 1997, incorporated herein by reference; and C. Mio, T, Gong, A. Terray, and D. W. M. Marr, *"Review of Scientific Instruments"*, 71, 5, 2196-2200, 2000, incorporated herein by reference.

Applicants demonstrated the hitherto neglected refractive index dependence of radiation pressure, allowing separation of chemically different materials. Applicants recognized that although refractive index affects the optical pressure force acting on a particle, it is the particle's chemical composition that leads to its unique refractive index. Particles of larger refractive index or size experience a greater optical force and have a greater retention distance (i.e., will be optically pushed farther upstream from the laser focal point against the liquid flow).

Fluidic devices according to various embodiments of the invention enable the separation, manipulation, and/or analysis of separate chemically different particles. Such particles include, for example, inorganic, organic, polymeric, and/or biological particles. Examples of inorganic particles include various glass (silica) particles, and gold or silver particles. Examples of biological particles include micelles, liposomes, particles labeled or coated with a protein, and/or particles at least partly filled with a biomaterial. Microorganisms that have been manipulated and or sorted include, for example, *Bacillus anthracis* (Sterne strain), *B. thuringiensis, B. megaterium, B. subtilis, B. cereus, Escherichia coli, Staphylococcus aureus, Enterococcus faecalis*, and *Pseudomonas aeruginosu.*

An embodiment of the invention includes a device having a collimated light source operable to generate a collimated light source beam, the collimated light source beam comprising a beam cross-section. The device further includes at least one body defining a first channel in a first plane, the first channel comprising a first channel cross-section, the first channel being oriented to receive the collimated light source beam such that the beam cross-section completely overlaps the first channel cross-section. Optionally, the body defines a second channel in a second plane orthogonal to the first plane, wherein the body defines a third channel in a third plane orthogonal to the first plane.

Optionally, the device includes a fluid input reservoir communicating with the second channel. Optionally, the device includes a pump communicating with the fluid input reservoir. For example, the pump includes, for example, a pump having a fixed flow rate or a pump having a dynamically changeable flow rate. For example, the pump includes a gravity-feed pump, a pneumatic pump, a syringe pump, a piezoelectric pump, a peristaltic pump, an electro-osmotic flow pump, or a photophoresis pump.

Optionally, the first channel includes a first end and a second end, the first channel defining a bulge one of at the first end, at the second end, or between the first end and the second end. Optionally, the shape of the bulge is, for example, a spherical shape, a cylindrical shape, a conical shape, a venturi shape, a helical shape, a three-dimensional circular relief, a three-dimensional triangular relief, a three-dimensional rectangular relief, a three-dimensional diamond relief, three-dimensional pentagonal relief, and/or a three-dimensional hexagonal relief.

Optionally, the body includes a substrate, a first plate, and a second plate. The substrate to defines the first channel, the first plate defining the second channel, and the second plate defining the third channel.

Optionally, the device also includes, for example, a lens, a beam chopper, an acousto-optic modulator, a phase-shifting optic, a holographic element, and/or a mirror located between the collimated light source and the first channel, and communicating with the collimated light source such that the beam cross-section overlaps the channel cross-section.

Optionally, the first channel includes a liquid core waveguide.

Optionally, the collimated light source includes, for example, a tunable laser, a continuous wave laser, a fiber laser, a pulsed laser, a femtosecond laser, a near infrared laser, a visible light laser, an ultraviolet light laser, a diode laser, or a vertical cavity surface emitting laser.

Optionally, the collimated light source includes, for example, a collimated light source having dynamically changeable power and/or a dynamically moveable collimated light source.

Optionally, the at least one body includes a plurality of bodies, each body comprising a respective channel, each respective channel comprising a respective channel cross-section, each respective channel being oriented to receive the collimated light source beam such that the beam cross-section completely overlaps the respective channel cross-section.

Optionally, the collimated light source beam includes, for example, a polarized beam, a Bessel beam, or one of several Hermite-Gauss beam types: $HG_{00}$, $HG_{01}$, $HG_{10}$, and $HG_{11}$, and higher order modes, or one of several Laguerre-Gauss beam types: $LG_0^0$, $LG_0^{+1}$, $LG_0^{-1}$, which possess angular momentum and higher order modes.

Another embodiment of the invention includes a method. A collimated light source operable to generate a collimated light source beam is provided. The collimated light source beam includes a beam cross-section. A body is provided, wherein the body defines a wall and a first channel in a first plane. The first channel includes a first channel cross-section, the first channel being oriented to receive the collimated light source beam such that the beam cross-section completely overlaps the channel cross-section. The collimated light source beam is transmitted through the channel. A fluid sample is transmitted through the channel, fluid sample including a plurality of particles of a same type. All of the particles of the plurality of particles are separated axially along the collimated light source beam. All of the particles of the plurality of particles are retained against the wall in the collimated light source beam.

Optionally, the fluid sample includes a colloidal sample and/or a biological sample.

Optionally, a fluid sample product comprising a greater concentration of particles than the fluid sample is produced.

Optionally, a fluid sample product free of the plurality of particles in the fluid sample is produced.

Another embodiment of the invention includes a fluidic device for optical separation, manipulation, and analysis using glass channels. The type of glass depends on the application, and includes, for example, soda lime, borosilicate, crown, and fused silica. Non-glass materials include polymethylmetharylate (PMMA), polycarbonates, and poly(dimethylsiloxane) (PDMS). In general, any material with transparency greater than 50% optical transmission at the selected optical wavelength between 200 nm-2000 nm can be used for construction of a flowcell device The channels are, for example, visibly transparent, over a long path length (e.g., 0.5-5 mm), and have a window for laser access. The fluidic device is, for example, constructed by placing two glass plates on either side of a glass substrate (or center plate) containing one or more fluidic orifices. The glass plates include respective fluidic networks communicating with the one or more fluidic orifices of the glass substrate. The fluidic networks in the outer glass plates are employed to deliver fluid and samples through the orifice in the center plate and carry them away after separation, manipulation, or analysis.

Figure 1:
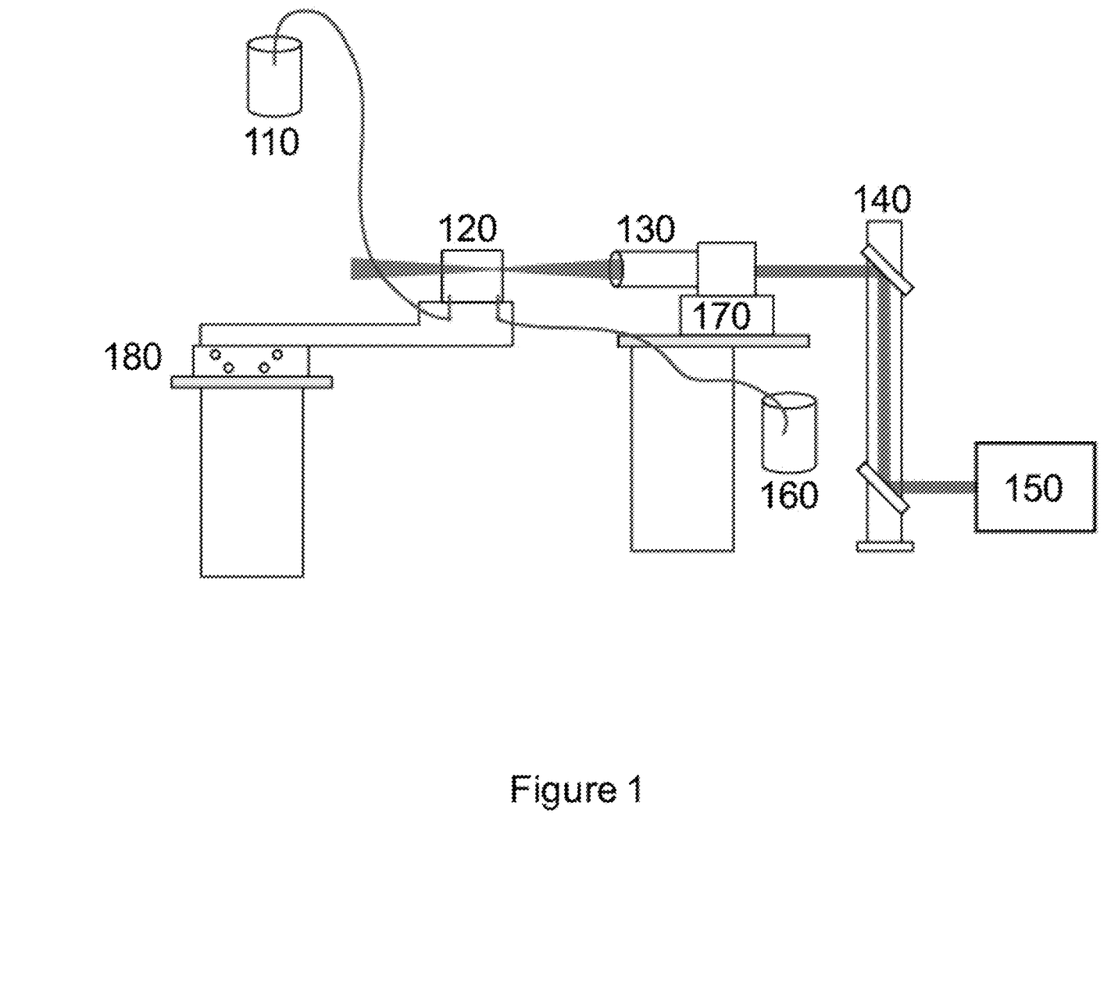
FIG. 1 is a diagrammatic view of an illustrative embodiment of the invention.

An embodiment of the invention is shown, by way of example, in FIG. 1, where a fluid input reservoir and/or flow source 110 (e.g., gravity, pneumatic pressure, syringe pump, or other flow method) propel fluid to a microfluidic flowcell 120 attached to a first X-Y-Z positioning stage 180. Light from a laser or other coherent, collimated light source 150 is directed by mirror assembly 140 or fiber optic to a lens 130 mounted on a second X-Y-Z positioning stage 170. This serves to align and focus the light beam through lens 130 and into a microfluidic flowcell 120.

Figure 2:
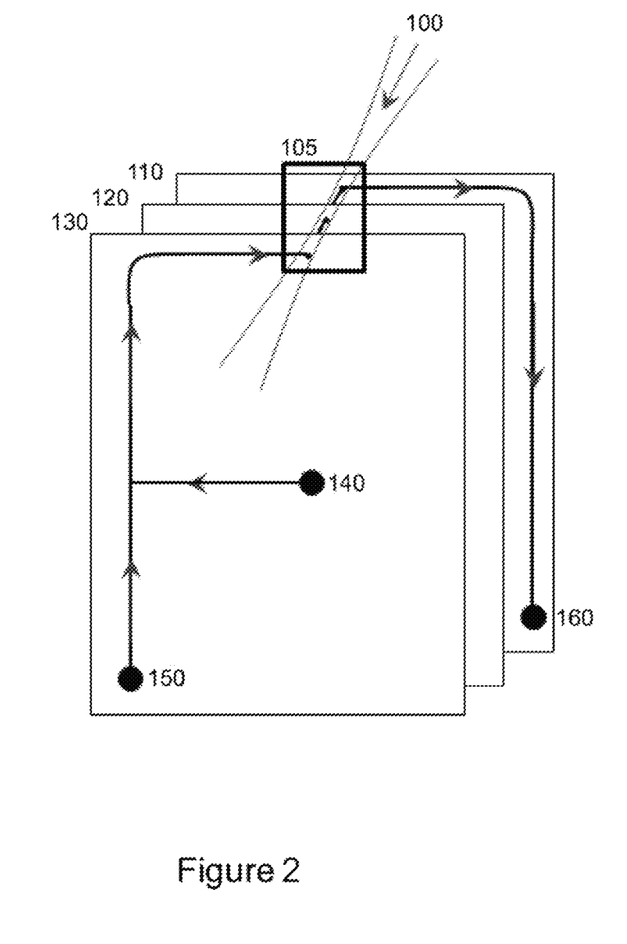
FIG. 2 is an exploded view of an illustrative body of an embodiment of the invention.

FIG. 2 shows the arrangement of the glass plates that are used to deliver fluid and sample to the orifice in a center plate 120. FIG. 2 is an exploded diagram, showing a separation for illustration purposes; but, in actuality, front plate 130, center plate 120, and rear plate 110 are aligned and tightly bonded together. Etched channels are shown in the front plate 130 containing the fluid input part 150 and the sample injection part 140. Alternatively, and not shown, the fluid and the sample are mixed prior to entry into front plate 130. Fluid and sample travel, for example, up the etched channel (wherein arrows in FIG. 2 show illustrative directions of flow of the fluid and sample) and through an orifice or microfluidic flowcell 120 in center plate 120 and into the rear plate 110. From there, the fluid travels, for example, across and down to the exit part 160, where fluid is optionally coupled with tubing for eventual collection. The boxed area 105 highlights the channel where the fluid interacts with the laser beam 100.

Figure 3:
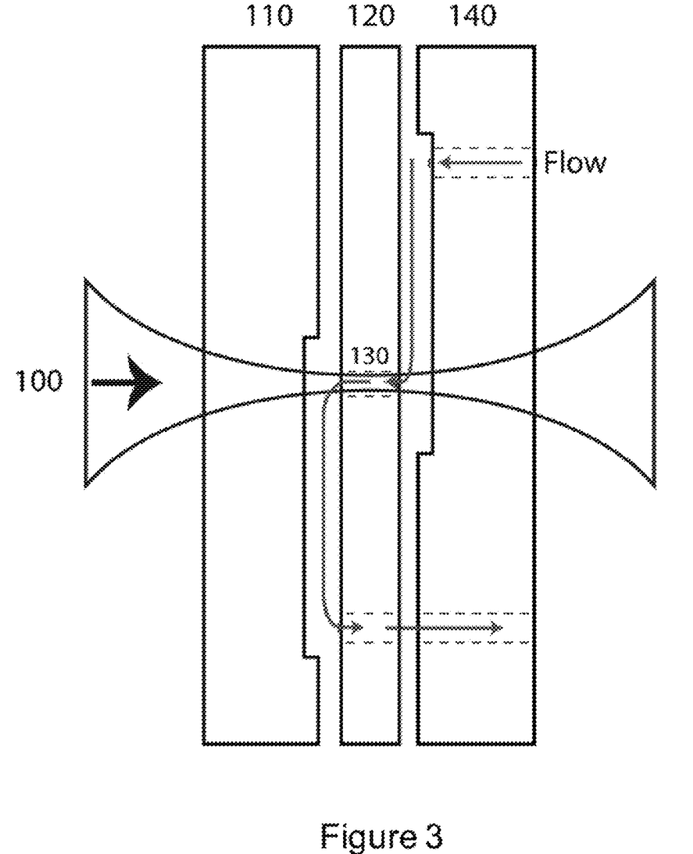
FIG. 3 is a cross-sectional view of the illustrative body of the embodiment of the invention shown in FIG. 2.
Figure 4A:
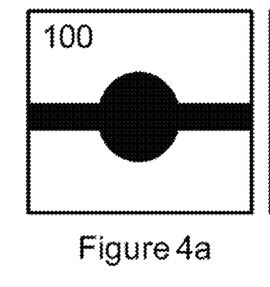
FIG. 4a-4i are alternative cross-sectional views of an illustrative center plate channel of an embodiment of the invention.
Figure 4B:
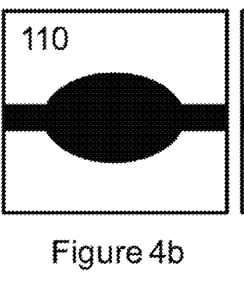
Figure 4C:
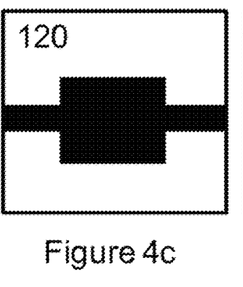
Figure 4D:
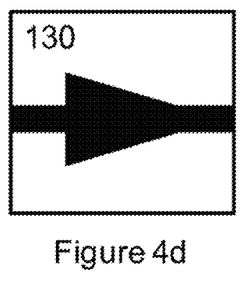
Figure 4E:
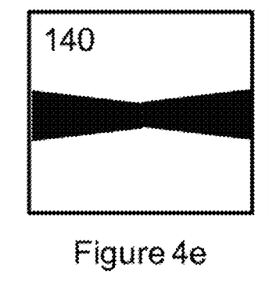
Figure 4F:
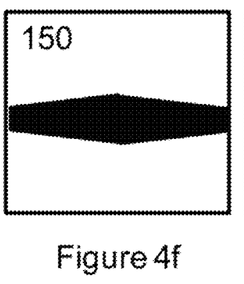
Figure 4G:
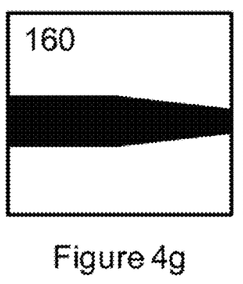
Figure 4H:
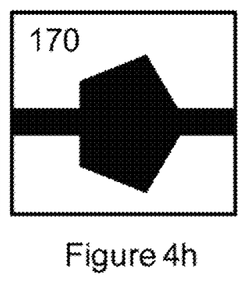
Figure 4I:
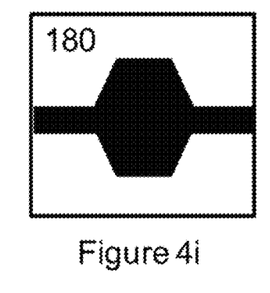

FIG. 3 is a top down, exploded view of the glass plate arrangement shown in FIG. 2. The orifice 120 (e.g., 1-1000 microns in diameter, 0.05-5.0 mm long) serves to force fluid with any suspended particles into the laser focal point aligned with the hole. The maximum length of the orifice should be long enough to accommodate the selected beam type without the beam overfilling the orifice and penetrating the side walls. (For a highly focused beam this would be a very short distance and for a collimated beam it would a long distance) The minimum length is dictated by the size of the particles and the ability to direct fluid and pass the application particle size range through the channel. The diameter/width of the channel is dictated by the laser beam size and the ability to pass the application particle size range through the channel. The orifice in the center glass plate, for example, matches the laser spot size at the focal point. Alternatively, the laser spot size at the focal point is greater than the orifice. In either case, there is no fluid region that is not exposed to light pressure. Given an appropriate laser power for the known flow rate in the neck down region of the channel, a particle capable of being trapped by the selected laser power cannot avoid being trapped and accelerated against the liquid flow away from the fluidic orifice.

Optionally, the region upstream and outside the orifice (i.e., etched channel in the front outer plate 140), includes a larger volume than the orifice itself. The larger volume develops a favorable optical retention region outside the orifice due to the lower flow velocity in this region. In this case, particles collected in this region because the optical force is able to retain them and actually pushes them against the wall where the flow makes the right angle turn to go into the orifice 130. This setup behaves like an optical and microfluidic step function that can be controlled and fine tuned by laser power, flow rate and the volumes of the fluidic regions involved. For a coarse laser filter, large spores (e.g., of cross-section 1 µm) are easily retained while tiny viruses (e.g., of cross-section 20-300 nm) and molecular biomaterial (e.g., protein, DNA, and RNA) will pass through for later collection or disposal. In this manner, a microbiological sample can be purified through the removal of chemical/biochemical material that could hinder further analysis such as spectroscopy. DNA detection (e.g., polymerase chain reaction), immune assay (e.g., enzyme-linked immunosorbent assays, etc. Fine sample separations or filtering is possible through the use of multiple orifices (i.e. multi-step separations) or through modified designs of the orifice. Optionally, several orifices in the glass microfluidic device permit an embodiment of the invention to be operated in series with one or more laser beams. This will enable trapping of different fractions from the injected sample, thus effecting a fractionation or separation of all suspended particles into specific groups based upon size, refractive index, and shape.

Figure 5:
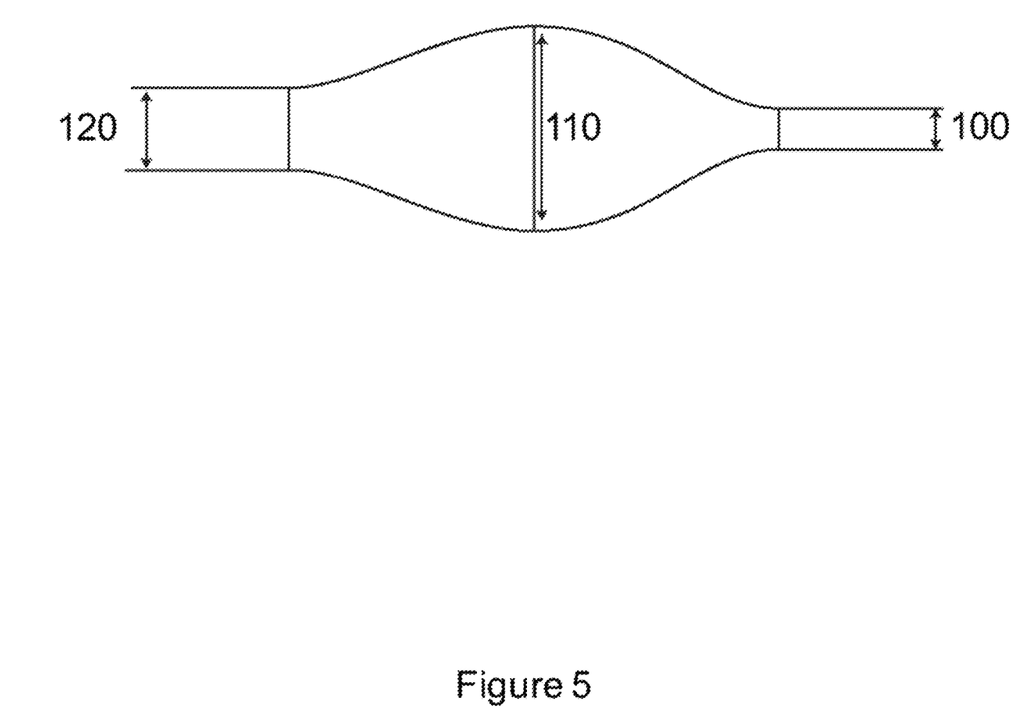
FIG. 5 is a cross-sectional view of a bulge region of a center plate channel of an embodiment of the invention.

A number of orifice designs are given in FIGS. 4a-4i. The simplest orifice shape is a straight through hole, which is effective as a fluidic step function. Possible useful shapes include circular 100, oval 110, square 120, triangular 130, venturi shape 140, bulge shape 150, and tapered orifice 160. Orifice shape where one end is smaller than the other is also useful as in shape 160, where the input side is smaller than the output side. This would prevent particles from being pushed up to the wall where a more dynamic separation in the flow field is desired. These two-dimensional illustrations in FIGS. 4a-4i are optionally manufactured for use in the device in two ways: a 2-D shape that is lofted (wherein the shape is raised to create 3-D shape, for example, achievable by chemical etching glass or other materials) or a 2-D shape that is lathed (wherein the shape is rotated 360 degrees to create a 3-D shape, for example, achievable by laser machining and/or combination with chemical etching). FIG. 5 is an illustration of an embodiment of a channel with an illustrative bulge wherein the input part 100 is smaller in diameter than the output part 120 of the microfluidic channel. The bulge region 110 serves to lower the flow to allow optical retention of particles and also provides room for a substantial number of particles to accumulate.

Figure 6:
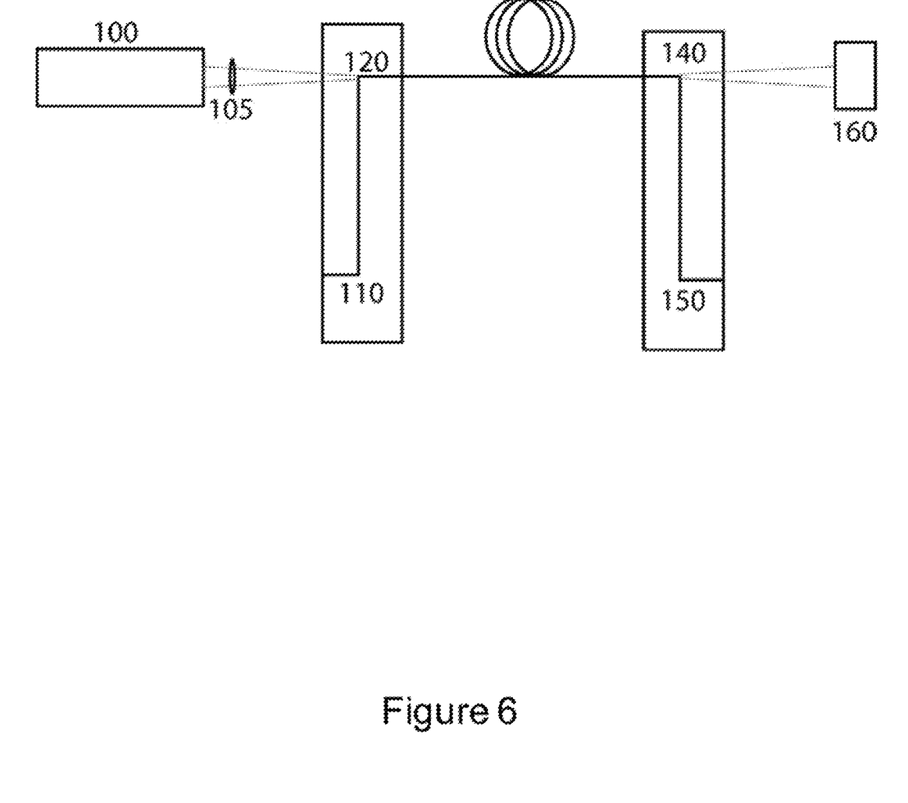
FIG. 6 is a diagrammatic view of an illustrative embodiment of the invention.

A further embodiment of the invention involves coupling the light into a liquid core waveguide connected to glass flowcells with etched channels similar to those described above. In FIG. 6, light from a laser 100 is focused with a lens 105 into an output microfluidic flowcell 120 connected to a liquid core waveguide 130. Fluid enters the microfluidic assembly at input part 150 and exits at output part 110 after passing through the liquid core waveguide 130. Light travels through the fluid containing particles to be separated in liquid core waveguide 130, and then enters the output microfluidic flowcell 140. The beam then exits output microfluidic flowcell 140 and its resulting power is, for example, measured by a thermopile power meters 160.

Figure 7:
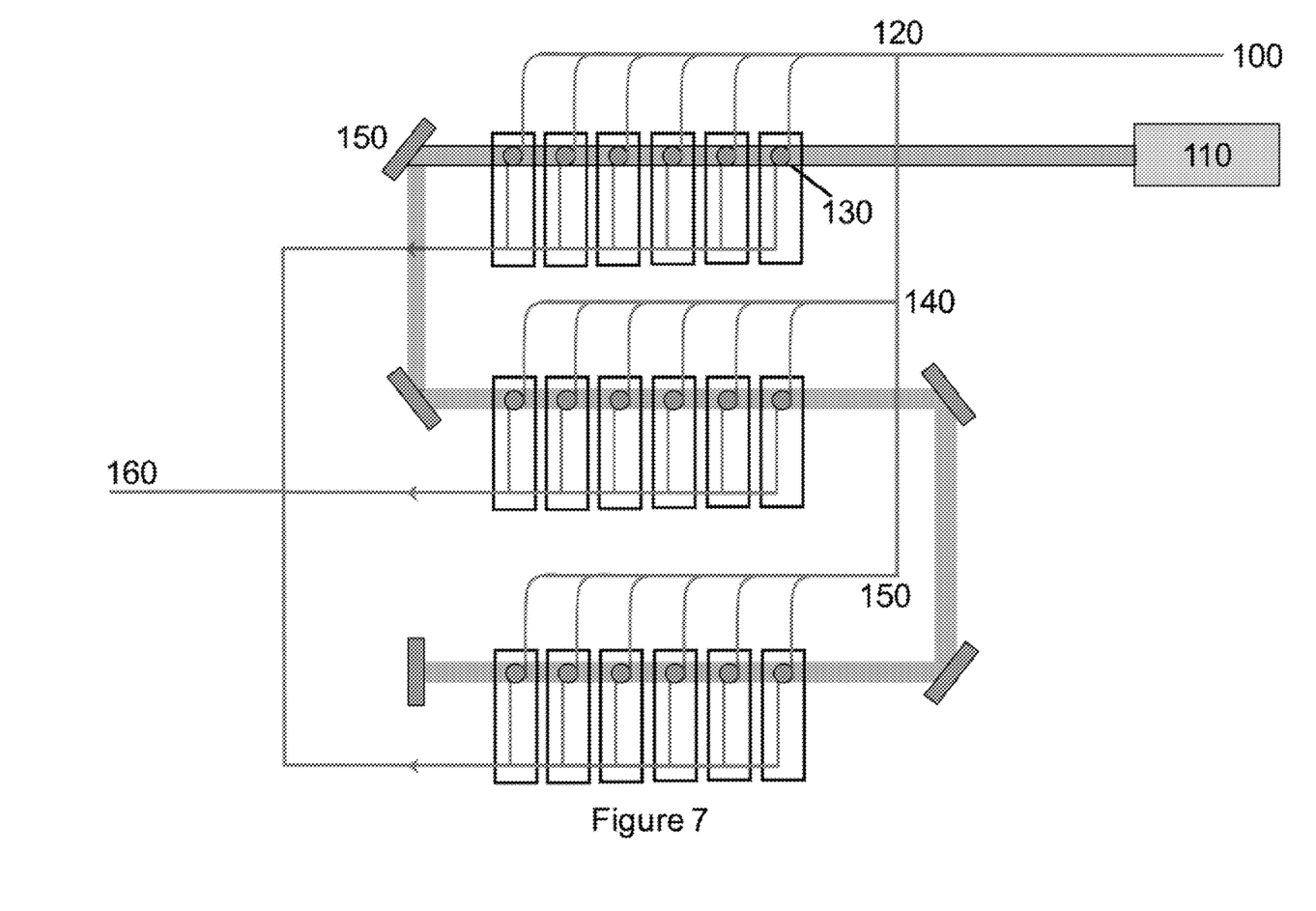
FIG. 7 is a diagrammatic view of an illustrative embodiment of the invention.

Another embodiment of the invention that includes many replicate optical retention/separation regions is shown, by way of example, in FIG. 7. The number of separation regions is dictated by the available optical power and the configuration and/or number of laser beams available. A benefit in having many orifices is the ability to operate them in parallel thus increasing the fluidic throughput of the optical separator. A microfluidic manifold design shown, by way of example, in FIG. 7, where the input flow 100 is split into beams 120, 140, and 150 or more locations, processed in parallel at many optical retention orifices 130, and then recombined at 160, will necessarily result in a higher overall flow rate while maintaining the linear velocities in the optical retention orifices. The laser 110 would be directed through the many orifices or could be routed through additional rows of orifices using mirrors 150. The channels that comprise the manifold are optionally etched in glass and the orifices are optionally arranged within the glass such that the laser travels through the etched surfaced. Alternatively, the plates could be stacked such that the orifices, while separated microfluidically, would be aligned to the laser could pass through optically clear and flat surfaces of the glass. An objective of this embodiment of the invention is to concentrate samples in the many optical retention orifices by processing much more fluid than is currently possible with only one retention region. Eluting the sample in a small volume would produce a substantial increase in concentration.

In an alternative embodiment of the invention, similar results may be achieved through the use of a flowcell containing two planes. In this embodiment, the orifice is omitted and two channels are overlapped such that the flow travels from the lower channel into the upper channel. The laser then enters the channels in the overlap region oriented axially to the flow, similar to the embodiments previously described.

The many features and advantages of the invention are apparent from the detailed specification, and thus, it is intended by the appended claims to cover all such features and advantages of the invention which fall within the true scope and spirit of the invention. Further, because numerous modifications and variations will readily occur to those skilled in the art, it is not desired to limit the invention to the exact construction and operation as illustrated and described, and accordingly, all suitable modifications and equivalents may be resorted to, falling within the scope of the invention.

What is claimed is:

1. A method comprising:
providing a collimated light source operable to generate a collimated light source beam, the collimated light source beam comprising a beam cross-section;
providing a body defining a first channel in a first plane, the first channel comprising a wall, a second channel in a second plane orthogonal to said first plane, said second channel communicating with said first channel, said second channel comprising a second channel cross-section, said second channel being oriented to receive the collimated light source beam, and a third channel in a third plane orthogonal to said second plane, said third channel communicating with said second channel;
transmitting the collimated light source beam through the second channel, the transmitted collimated light source beam comprising a beam direction, wherein the collimated light source beam is oriented to enter a cross-section of the third channel, then to pass through the first channel, and then to enter a cross-section of the second channel;
transmitting a fluid sample through the second channel, the fluid sample comprising a plurality of particles of a same type, the fluid sample comprising a flow direction opposite the beam direction;
retaining all of the particles in the plurality of particles axially along the collimated light source beam; and
separating all of the particles of the plurality of particles axially along the collimated light source beam; and
retaining all of the particles of the plurality of particles against the wall of the first channel in the collimated light source beam.

2. The method according to claim 1, wherein the fluid sample comprises one of a colloidal sample; and a biological sample.

3. The method according to claim 2, wherein the biological sample comprises at least one of the fluid sample comprising one of a plurality of viruses and a plurality of macrophages; the fluid sample comprising a plurality of spores; the fluid sample comprising a plurality of vegetative bacterial cells; the fluid sample comprising a plurality of yeast cells; the fluid sample comprising a plurality of eukaryotic cells; the fluid sample comprising a plurality of cancer cells; the fluid sample comprising a plurality of sperm cells; and the fluid comprising a plurality of pluripotent stem cells.

4. The method according to claim 1, further comprising:
producing a fluid sample product comprising a greater concentration of particles than the fluid sample.

5. The method according to claim 1, further comprising:
producing a fluid sample product free of the plurality of particles in the fluid sample.

6. The method according to claim 1, further comprising one of:
evaluating cell elasticity in the collimated light source beam; and
evaluating cell elasticity in the collimated light source beam against the wall of the first channel.

* * * * *